Figure 1:
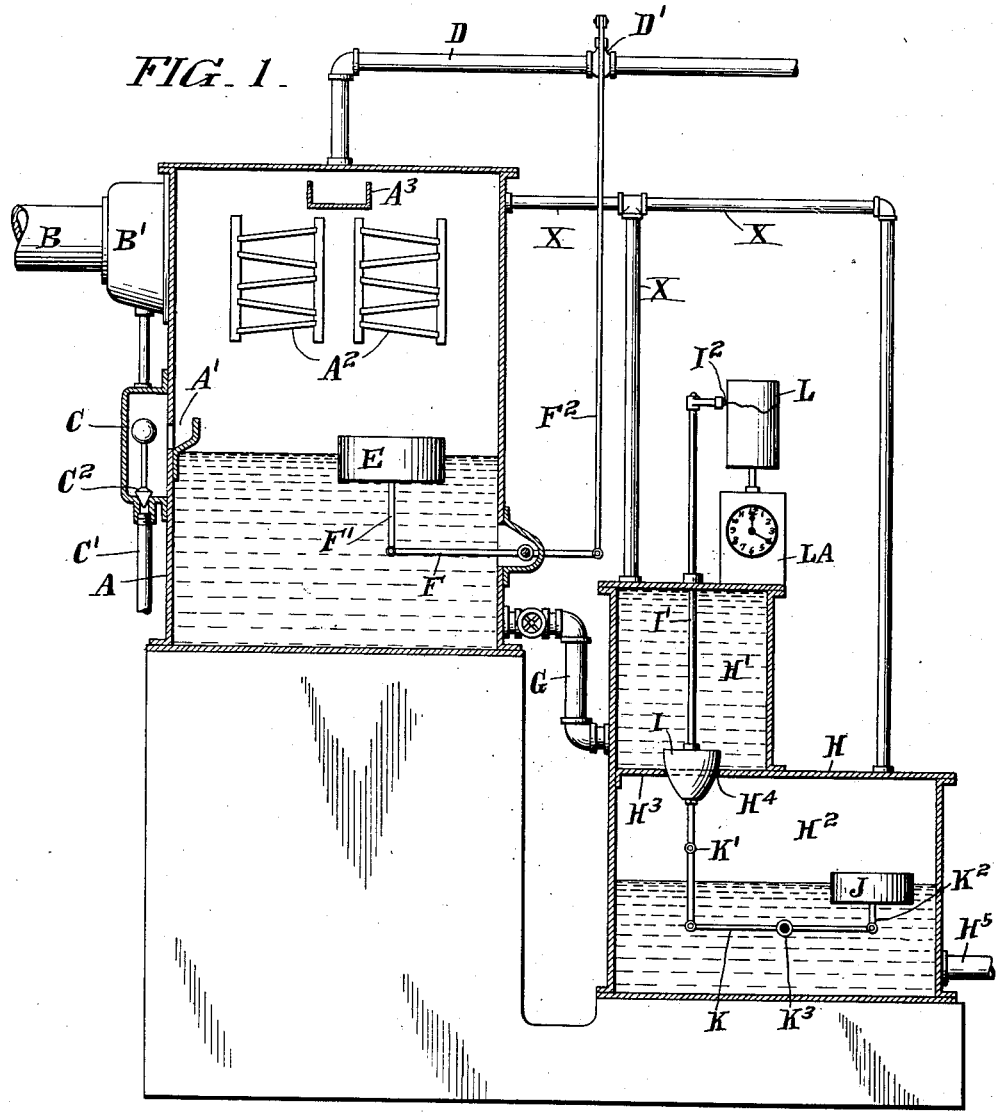

J. W. GAMBLE.
FLOW MEASURING APPARATUS.
APPLICATION FILED DEC. 20, 1913.

1,172,351.

Patented Feb. 22, 1916.
2 SHEETS—SHEET 1.

WITNESSES

INVENTOR
Joseph W. Gamble
BY
ATTORNEY

J. W. GAMBLE.
FLOW MEASURING APPARATUS.
APPLICATION FILED DEC. 20, 1913.
1,172,351.
Patented Feb. 22, 1916.
2 SHEETS—SHEET 2.
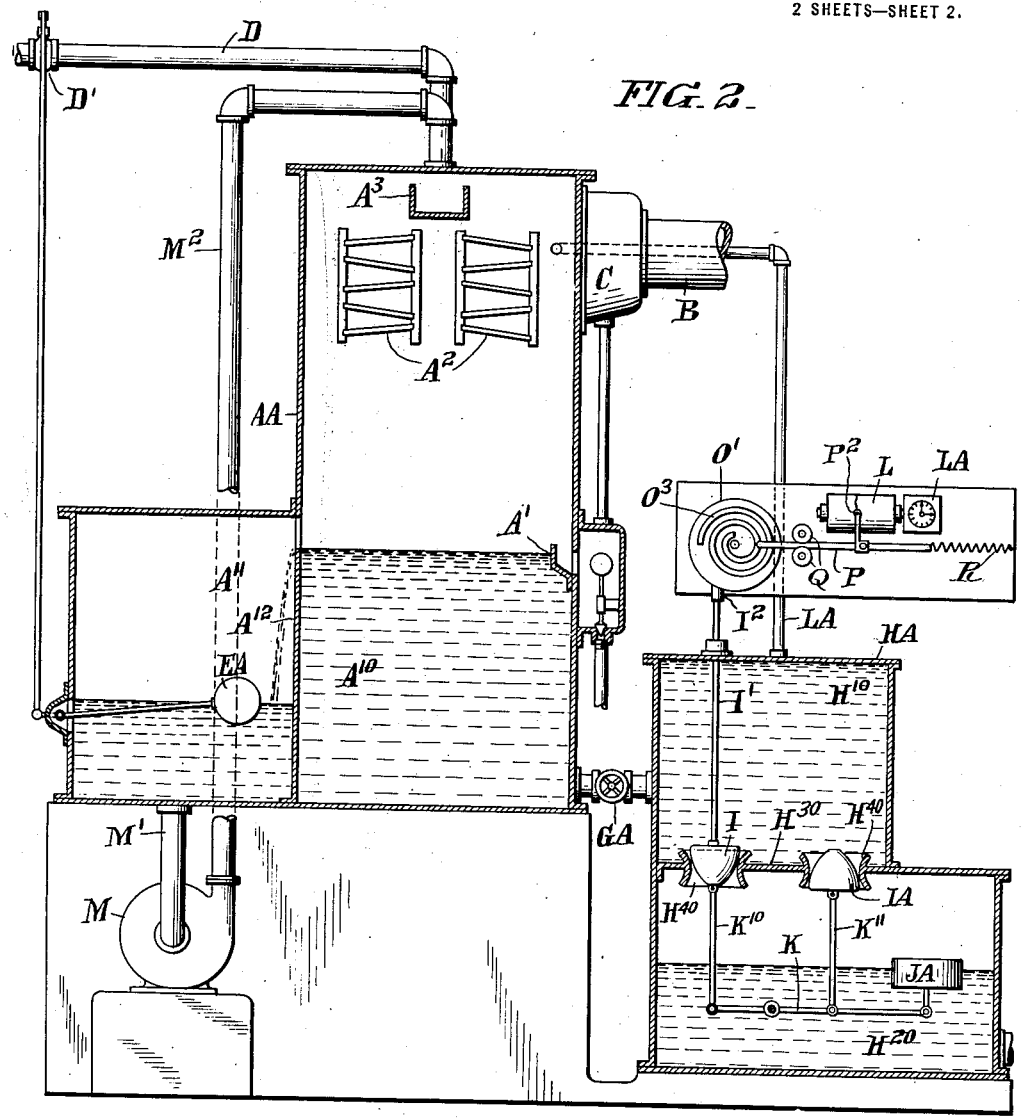
FIG. 2.
FIG. 3.
WITNESSES
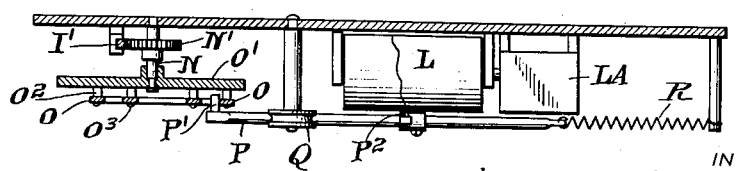
INVENTOR
Joseph W. Gamble
BY
ATTORNEY

UNITED STATES PATENT OFFICE.

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS UNDER THE FIRM-NAME OF HARRISON SAFETY BOILER WORKS.

FLOW-MEASURING APPARATUS.

1,172,351.   Specification of Letters Patent.   Patented Feb. 22, 1916.

Application filed December 20, 1913. Serial No. 807,879.

*To all whom it may concern:*

Be it known that I, JOSEPH W. GAMBLE, a citizen of the United States of America, residing in the city and county of Philadelphia, in the State of Pennsylvania, have invented certain new and useful Improvements in Flow-Measuring Apparatus, of which the following is a true and exact description, reference being had to the accompanying drawings, which form a part thereof.

My present invention consists in improved apparatus for measuring a flowing liquid; and the primary object of the invention is to provide simple and effective measuring means suitable for use when the conditions as to temperature, pressure, and volume of flow, are such as, or are analogous to those experienced with respect to boiler feed water passing from an open feed water heater to a boiler feed pump.

In carrying out my invention, I provide in the path of flow of the liquid to be measured an adjustable orifice or orifices, means for maintaining an approximately constant accumulation of liquid on the inlet side of said orifices, and means automatically responsive to the accumulation of liquid in some portion of the conduit on the outlet side of said orifice or orifices for adjusting the flow capacity of said orifices as required to supply the demand for the liquid flowing. By proceeding in this manner, the conditions governing the flow through the adjustable orifice or orifices are such as to make the rate of flow accurately responsive to the orifice adjustment and I obtain an indication, record or integration of the flow by connecting the orifice adjusting provisions to suitable indicating, recording or integrating mechanism. Advantageously and preferably, the orifice adjusting provisions are of such character that the movement thereof to effect different flows will be in linear proportion to the rate of flow.

In carrying out my invention, I provide means for maintaining a practically constant head on the supply side of the orifice, and I adjust the orifice in response to the change in surface level in an accumulation portion of or reservoir connected with the conduit through which the liquid flows and not in direct response to the pressure or velocity of flow of the liquid.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described several of the forms in which the invention may be embodied.

Of the drawings: Figure 1 is an elevation partly in section of water heating and measuring apparatus embodying one form of my invention; Fig. 2 is an elevation partly in section of water heating and measuring apparatus embodying a second form of my invention; and Fig. 3 is a partial sectional plan taken on the line 3—3 of Fig. 2.

In the drawings, and referring first to the construction shown in Fig. 1, A represents an open feed water heater of well known type. As shown, the feed water heater is supplied with steam for heating the water through the pipe B and the usual oil separator B′ which drains into a float box C. The latter receives the overflow or waste from the heater A when the water level in the latter rises above the normal level to the level of the top of the overflow spout A′. C′ represents a waste pipe connection leading from the bottom of the chamber C and opened and closed by the float actuated valve C². The water to be heated is supplied to the heater through the pipe D which discharges into the usual overflow trough A³, and the water overflowing from the trough A³ runs down over the usual splash trays or baffles A². The flow of water into the heater through the pipe D is regulated by a valve D′, which is automatically controlled through a lever F and links F′ and F² by a float E located within the heating chamber and responsive to the water level therein. In so far as above described the heater does not differ from those in common use, but I prefer to so proportion the float E and the lever and link connections between it and the valve D′ that the height of water level in the heating chamber will be regulated more closely than is the case in ordinary heaters of this type.

G represents the service water discharge connection from the heating chamber. The pipe G leads to the inlet chamber H' of a measuring tank H. The chamber H' is separated from an outlet chamber $H^2$ beneath it by a horizontal partition $H^3$ in which is formed a discharge orifice $H^4$. The effective area of the orifice $H^4$ under working conditions is regulated by and depends upon the position of an adjusting device in the form of an obturator or plug I which is axially disposed and axially movable with respect to the orifice $H^4$, and is preferably so shaped that the flow through the orifice will vary in linear proportion with the vertical displacement of the plug I above its lowermost position in which it closes the orifice $H^4$ and prevents all flow therethrough. Those skilled in the art will understand that it is theoretically possible to calculate the proper shape to be given to the plug I to obtain this result when the head on the supply side of the orifice is constant or varies in a predetermined manner, but in practice the shape of the plug is ordinarily arrived at experimentally. In general, I may say, however, that the net cross sectional area of the orifice should vary approximately with the axial movement of the plug if the axial movement of the latter is to be proportioned to the flow with a constant head on the supply side of the orifice, but that due allowance must be made for the change in coefficient of discharge through the orifice, as this coefficient will vary with the position of the plug. The plug is axially adjusted to increase or diminish the net area of the orifice and thereby to correspondingly change the flow by means of a float J located within the chamber $H^2$ and responsive to the height of water level therein. The float is connected to the plug I by a lever K which is fulcrumed at $K^3$ and is connected at its ends by the links K' and $K^2$ to the plug I and float J respectively. In order to avoid disturbances due to the change in pressure occurring from time to time in the steam space of the heating chamber, I connect the steam space in the upper ends of the compartment $H^2$ of the measuring tank and the heating chamber by a pressure equalizing pipe connection X. Inasmuch as the vertical position of the plug I determines and is a measure of the rate of flow through the orifice $H^4$, this flow may be indicated, recorded or integrated by suitable means connected to and actuated by the plug I. The somewhat conventionally illustrated provisions for this purpose comprise a small rod I' extending through a suitable stuffing box provided on the top wall of the chamber H' and carrying a pencil or pen $I^2$ adapted to make a record on the record surface of, and carried by, the drum L which is rotated by the clock mechanism LA. Inasmuch as with the construction described the vertical position of the plug I varies in linear proportion with the rate of flow through the orifice, the quantity flowing in a given time may be integrated from the record traced on the drum L by means of a planimeter.

$H^5$ represents the service discharge pipe from the compartment $H^2$ of the measuring tank.

With the apparatus shown in Fig. 1 the position of the plug I depends primarily on the position of the float J, and the flow is increased and decreased in response to corresponding changes in the demand for water withdrawn through the pipe $H^5$. The apparatus shown for regulating the height of water level in the heater can be so adjusted and proportioned as to make the percentage change in the head of water above the orifice $H^4$ so small as to be practically negligible. Moreover, under ordinary operating conditions the maximum variation in the height of water level in the heating chamber will occur when the water level builds up to the overflow level from the condensation of steam admitted to the heating chamber through the pipe B after the water supply valve D' is closed. The error in the readings or record obtained at this time is of small consequence, however, both because the flow through the orifice is small and also the coefficient of discharge decreases as the effective area of the orifice becomes very small, so that this diminution in the coefficient of discharge at light flows compensates in a measure for the increase in head which may then occur.

In the apparatus shown in Fig. 2, I have made provisions for maintaining a more nearly constant head of water on the supply side of the orifice under all conditions than is obtainable with the apparatus shown in Fig. 1. The apparatus shown in Fig. 2 comprises a heater AA having a water space $A^{10}$ in the lower portion of the heating chamber proper from which the water flows over the weir or partition $A^{12}$ into the water storage space $A^{11}$ alongside the water space in the bottom of the heating chamber proper. M represents a centrifugal pump having its suction pipe M' opening to the chamber $A^{11}$ near the bottom of the latter and having its delivery pipe $M^2$ discharging into the overflow trough $A^3$ at the top of the heating chamber. The valve D' regulating the admission of water to the heater through the supply pipe D, is controlled by a float EA responsive to the height of water level in the chamber $A^{11}$. Water passes from the chamber $A^{10}$ to the measuring apparatus through the pipe GA. Aside from the features referred to, the heater AA may be identical with the heater A of Fig. 1.

It will be apparent without further explanation that under all ordinary conditions the water level in the chamber $A^{10}$ will be constantly maintained at the height at which water overflows from this chamber into the chamber $A^{11}$. The remaining water storage capacity of the chamber $A^{11}$, after the water level therein has built up to the level at which the float EA closes the valve D', is ample under all ordinary operating conditions to hold the excess water which may leak into the heater past the valve D' or may be formed in the heater by condensation during any period in which the water flowing out of the heater through the connection GA is less than the amount of water then leaking into the heater and formed therein by condensation. The pump M should be of sufficient capacity to pump water at least as rapidly as the maximum rate at which water is withdrawn from the chamber $H^{10}$ through the pipe GA, but the head against which the pump delivers is quite small and the power consumed in the operation of the pump is so small as to be unimportant. Furthermore the use of a circulating pump permits of the effective heating of a given amount of water in smaller and otherwise less expensive apparatus than would be required if no such pump were used.

The measuring tank HA shown in Fig. 2 differs from that shown in Fig. 1 in that there are two discharge orifices $H^{40}$ formed in the wall $H^{30}$ separating the inlet compartment $H^{10}$ from the outlet compartment $H^{20}$ of the measuring tank. In conjunction with each orifice $H^{40}$ I employ an obturator or plug. These plugs I and IA may be identical in shape with each other and shaped according to the principles explained in conjunction with the apparatus of Fig. 1, but are oppositely directed; that is, the plug I is arranged as in Fig. 1, whereas the plug IA has its small end uppermost and is moved downward to increase the effective area of the orifice to which it pertains. As shown, the two plugs are connected by links $K^{10}$ and $K^{11}$ to the opposite ends of the lever K to which is also connected the float JA. The connection between the plugs I and IA and the lever K may well be such that the movements of the two devices in opposite directions are proportional and equal when the two plugs and two orifices are of equal size. With this arrangement the downward thrust of the water exerted on each plug opposes and more or less exactly balances the downward thrust on the other, thus correspondingly reducing the duty of the float JA by which the plugs are adjusted. As shown, the plug I is connected to suitable recording mechanism. The recording mechanism employed in Fig. 2 and its connection to the plug I might be exactly the same as in Fig. 1, but, as shown, there are differences hereinafter explained. If the movements of one plug correspond exactly to the movements of the other, the record thus obtained will be a measure of the flow through both orifices. Should there be lost motion in the connection between the two plugs I and IA, however, this might prejudicially effect the accuracy of the apparatus when one only of the plugs is directly connected to a corresponding recording and integrating mechanism as is the case in the arrangement shown in Fig. 2. It is to be noted, however, that when an orifice adjusting plug, as the plug I of Figs. 1 and 2, is directly connected to a corresponding exhibiting mechanism, lost motion in the connection between that plug and the means controlling its adjustment, whether it be a simple float as the float J of Fig. 1, or a more complex means such as is formed by the float JA and plug IA of Fig. 2, is immaterial so far as the measurement of the flow past the plug I to which the exhibiting means is directly connected is concerned.

In the particular form of recording apparatus shown in Fig. 2 and Fig. 3 the stem I' secured to the plug I is provided with rack teeth $I^2$ on its external portion which mesh with a spur gear N' secured to a shaft N. The latter also carries a cam O. As shown the cam O is in the form of a spiral strip of sheet metal secured to a disk O' as by the posts $O^2$ and screws $O^3$. The disk O' is secured to the shaft N. Coöperating with the cam O is a bar P sliding in guides Q and provided with a cam follower in the shape of a projection P' adapted to bear against one edge of the cam strip O. A spring R lightly holds the projection P' against the edge of the cam strip O at all times. The bar P carries a recording point $P^2$ adapted to trace a record on the clock driven record drum L, which may be identical with that shown in Fig. 1, except that as shown in Figs. 2 and 3 the axis of the drum is horizontal.

It is theoretically possible, of course, to shape the cam O to give a proper record of the flow no matter how the obturators I and IA are shaped. I prefer, however, to shape the obturators as shown, so that the flow through the orifices will be approximately in linear proportion to the displacement of the obturators from their no flow position. In such case the slide actuating edge of the cam strip O will approximate a simple spiral departing from the latter as required to correct for irregularities in the shape of the obturators and to correct for the variations in the co-efficients of discharge. In practice the obturators and the cam may well be given the calculated theoretical shapes required and then the cam may be readily altered in shape as found necessary on testing the apparatus, for it is obviously a much simpler matter to change the shape of the cam than of the obturators in calibrating the apparatus. The cam O also forms an effective multiplying device for making the movements of the recording point $P^2$ greater or less than the corresponding movements of the obturator to which it is connected in any desired ratio.

While the various forms of apparatus shown all embody an open feed water heater for heating the water measured, it is hardly necessary to point out that the operation of the measuring apparatus does not necessarily depend upon whether or not the liquid measured is heated, and if so, upon the method of heating.

To avoid the *vena contracta* effect in the flow through the discharge orifices, the latter may be in the form of elongated nozzle openings shaped as shown in Fig. 2 to reduce the *vena contracta* effect to a minimum.

While in accordance with the provisions of the statutes I have illustrated and described the best forms of my invention now known to me, it will be apparent to those skilled in the art that changes may be made in the forms of apparatus disclosed without departing from the spirit of my invention, and that under some conditions certain features of my invention may be used without a corresponding use of other features.

Having now described my invention, what I claim as new and desire to secure by Letters Patent, is:

1. Liquid flow measuring apparatus comprising in combination, means providing a path of flow including an adjustable orifice or orifices for the liquid to be measured, and a portion beyond the orifice or orifices wherein liquid may accumulate, liquid supply means adapted to maintain a substantially constant liquid head at the supply side of said orifice or orifices, means responsive to the accumulation of liquid in the said portion of said path of flow for adjusting the latter as required to permit a flow therethrough corresponding to the demand for the liquid flowing, and means connected to the orifice adjusting means for measuring the flow through said orifice or orifices.

2. Liquid flow measuring apparatus comprising in combination, means providing a path of flow including an adjustable orifice or orifices for the liquid to be measured and a portion beyond the orifice or orifices wherein liquid may accumulate, liquid supply means adapted to maintain a substantially constant liquid head at the supply side of said orifice or orifices, means responsive to the accumulation of liquid in the said portion of said path of flow for adjusting the latter as required to permit a flow therethrough corresponding to the demand for the liquid flowing, said orifice adjusting means including a member movable in approximately linear proportion to the change in flow corresponding to said movement.

3. Liquid flow measuring apparatus comprising in combination, means providing a path of flow including an adjustable orifice or orifices for the liquid to be measured and a portion beyond the orifice or orifices wherein liquid may accumulate, liquid supply means adapted to maintain a substantially constant liquid head at the supply side of said orifice or orifices, means responsive to the accumulation of liquid in the said portion of said path of flow for adjusting the latter as required to permit a flow therethrough corresponding to the demand for the liquid flowing, said orifice adjusting means including a member movable in approximately linear proportion to the change in flow corresponding to said movement and measuring means connected to and actuated by said member and including provisions for compensating for departures from the linear ratio between the movements of said member and the changes in the rate of flow corresponding thereto.

JOSEPH W. GAMBLE.

Witnesses:
 ARNOLD KATZ,
 S. STEWART.